(No Model.)
J. MAXHEIMER.
FENDER FOR BIRD CAGES.
No. 260,767. Patented July 11, 1882.
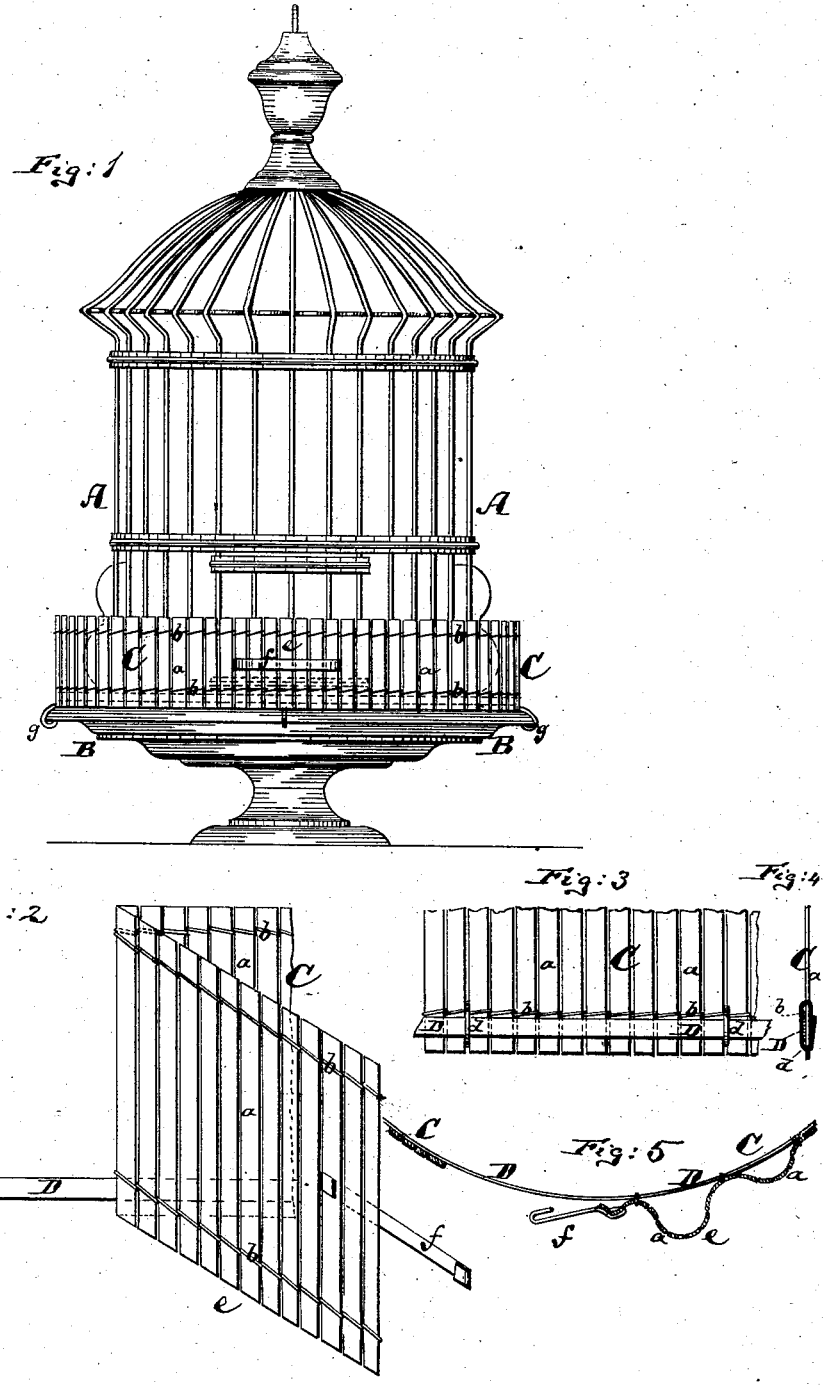

United States Patent Office.

JOHN MAXHEIMER, OF BROOKLYN, NEW YORK.

FENDER FOR BIRD-CAGES.

SPECIFICATION forming part of Letters Patent No. 260,767, dated July 11, 1882.

Application filed May 1, 1882. (No model.)

*To all whom it may concern:*

Be it known that I, JOHN MAXHEIMER, of Brooklyn, in the county of Kings and State of New York, have invented a new and Improved Fender for Bird-Cages, of which the following is a specification.

Figure 1 is a front elevation of a bird-cage having my improved fender. Fig. 2 is a detail face view, on an enlarged scale, of part of said fender. Fig. 3 is a detail front view of part of the fender, showing the manner of connecting the upright slats with the inner spring or band. Fig. 4 is a cross-section of the same. Fig. 5 is a top view of a modification of the same.

The object of this invention is to adapt flexible fabrics, which are composed of wooden slats placed side by side and joined by threads, to serve as fenders for the lower parts of bird-cages—that is to say, as fenders that are to prevent sand and particles of food being thrown out by the bird. Such fenders as heretofore proposed had to be made removable and detachable and were therefore inconvenient because not adapted to allow the opening of the cage-door or access to the feed-cups.

My improved fender has all the advantages of the fenders of prior construction and avoids the disadvantages thereof; and it consists in combining the slatted flexible structure above referred to with a shape-maintaining spring or distending-band; also, in details hereinafter described, showing how it can be secured to the cage and to the spring or band, and how it is provided with openings giving access to parts of the cage.

In the drawings, the letter A represents the top portion, and B the base, of a suitable bird-cage. C is my improved fender. The same is constructed of a series of slats, $a\,a$, placed vertically side by side and woven or tied together by strings or cords $b\,b$. Such slatted structures are old and have already been used for window-blinds and analogous purposes. I make the slatted structure of the length required and then secure it to the circular spring-band D, being a band of sheet metal, whalebone, or the like. I tie the slatted structure C to the band D by suitable wire loops, $d$, that pass around the cords $b$, as shown in Figs. 3 and 4, or through holes in the slats. The band D, when of circular form, will maintain the fender in the corresponding shape, and if the fender is intended for a cage other than one of circular form, the band will be shaped to correspond, and will then also maintain the slatted fender in the desired shape.

Wherever the fender is to be provided with an opening to give access to the door of the cage or to the feed-cups, such opening is provided by cutting or disconnecting the slatted structure vertically at one place, as indicated in Fig. 2, thus furnishing a sort of a door or gate, $e$, in the body of the fender, but the continuity of the band D is not interferred with. Whenever this opening is to be shut, this portion $e$ is brought against the band D and connected with the remaining part of the fender by a suitable hook or catch, $f$, thereby rendering the fender continuous again.

Instead of allowing the portion $e$ to be swung open, it may be allowed to slide back on the band D, as indicated in Fig. 5.

The entire fender can be fastened to the bottom B of the cage by wire clasps $g$, which project outward from the band D or from the slatted part of the fender C.

Instead of making the fender-body C of a slatted structure, it may be made of any other analogous material; but the slatted structure is desirable, as it maintains its vertical rigidity without losing its horizontal flexibility.

I claim—

1. The flexible fender C, combined with the inner continuous distending-band, D, and with the back and sides of a cage, substantially as described.

2. The fender C, having longitudinal connecting-cord $b$ combined with band D and upright fastening-loops $d$, substantially as described.

3. The flexible fender C, combined with the continuous band D, and provided with opening section or sections $e$, having fastening device $f$, substantially as described.

4. The combination of the flexible fender C and band D with the fastening-clasps $g$ at lower edge, by which clasps the fender can be secured to a cage, as described.

JOHN MAXHEIMER.

Witnesses:
 WILLY G. E. SCHULTZ,
 WILLIAM H. C. SMITH.